F. ANDERSEN.
DEVICE FOR AUTOMATICALLY CONTROLLING THE MOVING OF HEAVY OBJECTS.
APPLICATION FILED APR. 12, 1915. RENEWED DEC. 27, 1918.
1,293,296. Patented Feb. 4, 1919.
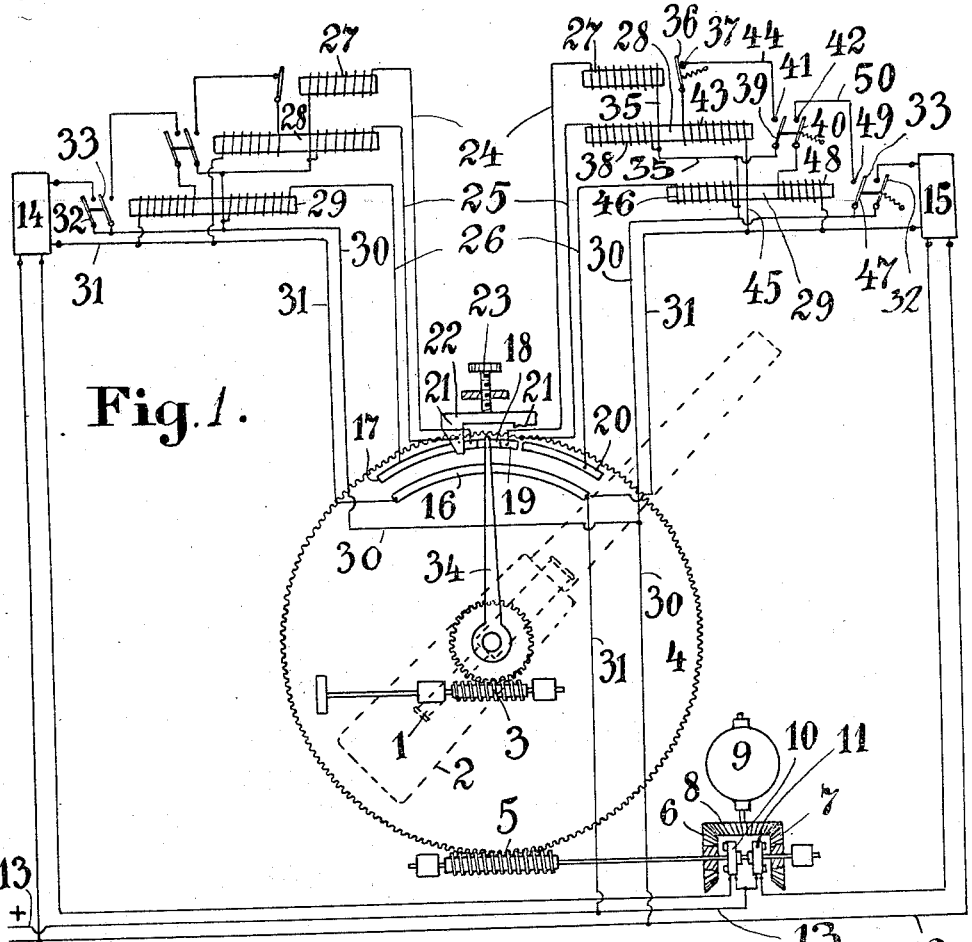
Fig. 1.
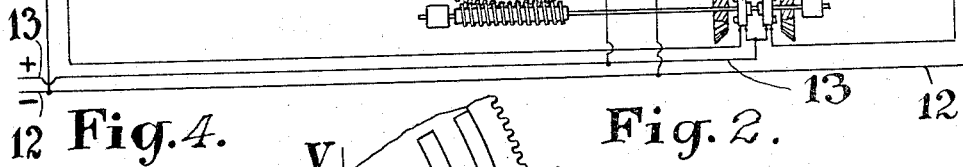
Fig. 4. Fig. 2.
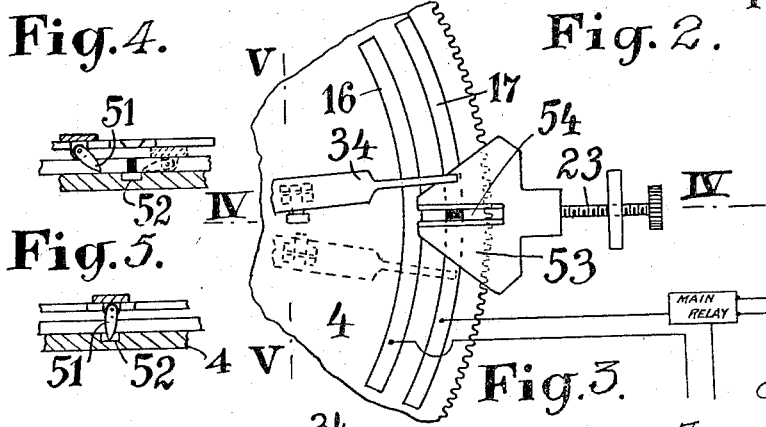
Fig. 5. Fig. 3.
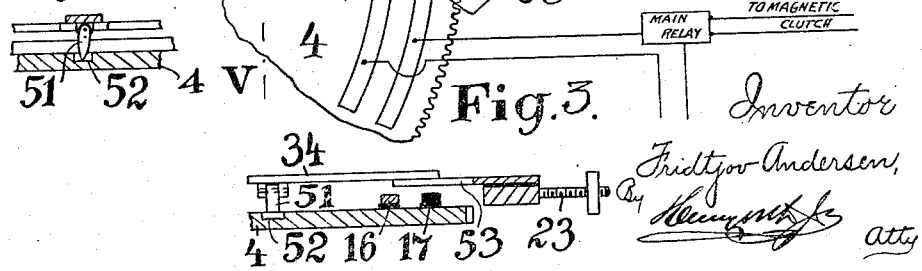
Inventor
Fridtjov Andersen,
By
atty

UNITED STATES PATENT OFFICE.

FRIDTJOV ANDERSEN, OF DRÖBAK, NEAR CHRISTIANIA, NORWAY.

DEVICE FOR AUTOMATICALLY CONTROLLING THE MOVING OF HEAVY OBJECTS.

1,293,296.     Specification of Letters Patent.    Patented Feb. 4, 1919.

Application filed April 12, 1915, Serial No. 20,922. Renewed December 27, 1918. Serial No. 268,512.

*To all whom it may concern:*

Be it known that I, FRIDTJOV ANDERSEN, a subject of the King of Norway, residing at Dröbak, near Christiania, Norway, have invented certain new and useful Improvements in Devices for Automatically Controlling the Moving of Heavy Objects; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to devices for automatically controlling the movement of heavy objects, such as guns, by means of a light controlling or sighting apparatus, the movement of heavy object being dependent and as nearly as possible synchronous with the movement of the controlling apparatus.

The invention is particularly adapted for use in connection with the automatic sighting and gun laying system described in my U. S. Letters Patent No. 1,167,247, dated January 4, 1916, but it will be easily understood that the invention may also be applied on other systems for controlling the movement of a heavy object by means of a small and light controlling mechanism.

In systems of the kind referred to the movement of the controlling mechanism in a certain direction relatively to the object under control serves to actuate a relay or controlling valve which in turn cuts in the mechanism for moving the object under control in the same direction. In the following the movements referred to will always be rotative but it is obvious that the same principles may also be applied on linear movements.

When the object under control shall follow as closely as possible the movements of the controlling device it is obvious that the former must be capable of moving at least as quick as the latter and practically the movement of the controlled object must be quicker than the movement of the controlling device. It follows that the controlled object will perform a stepwise movement behind the controlling mechanism, the intervals between the steps being determined by the time required for starting and stopping the driving mechanism of the object under control. In practice it has been found that the great number of starts and stops caused by such a controlling system has an injurious effect on the machinery, causing an inordinate wear of the moving parts.

The object of the present invention is to provide a controlling mechanism of the kind referred to by the use of which the steps of the movement are made longer and less frequent so that no vibrations are caused and the object under control will follow the movements of the controlling device with an adjustable degree of accuracy, without making a great number of starts and stops necessary.

On the drawings:

Figure 1 is a diagrammatical plan of an embodiment of the invention as adapted on a gun laying system.

Fig. 2 is a plan view of a modified detail on a larger scale.

Fig. 3 is a section on the line IV—IV on Fig. 2.

Fig. 4 is a section on the line V—V on Fig. 3.

Fig. 5 is a section corresponding to Fig. 4 but with the parts in another position.

Referring now to Fig. 1, 1 represents a sighting telescope and 2 a gun, both being shown in dotted lines for the sake of clearness. The sighting telescope is moved by means of the worm-gear 3, which may be adjusted by hand. The gun is mounted on the toothed disk 4 which meshes with the worm 5. On the shaft of said worm 5 are loosely mounted beveled gears 6, 7 which mesh with a beveled gear 8 on the shaft of a continuously rotating motor 9 or other driving mechanism.

In connection with gears 6, 7 electric couplings 10, 11 are mounted on the shaft of worm 5, each of said couplings on being cut in acting to connect its gear to the shaft so that the same can be driven in opposite directions by cutting in one or the other of said couplings.

Electric current is supplied to the coupling 6 from the main lines 12, 13 through relay 14 and to the coupling 7 through relay 15

The disk 4 is provided with two contact bars 16, 17, the bar 16 being unbroken and connected to the main line 13 by branch 31. The other contact bar 17 is provided with a middle insulated part 18 and on each side of this part are two insulated contacts 19, 20. The space intermediate said contacts 19, 20 is covered by a wedge-shaped contact plate 21 two such plates, one for each side, being secured to a common bar 22 adjustable by means of screw 23. By adjustment of said screw the part of bar 17 covered by plates 21 can be varied. Though the means shown for effecting such variation consist of a screw only it is obvious that the said adjustment may also be performed automatically or not by other known adjustment devices.

The parts 19, 21 and 20 of the sliding bar 17 on each side are connected by means of lines 24, 25, 26 to relays 27, 28, 29, which are connected with their other poles to branch 30 from main line 12.

The main relays 14, 15 are connected at one pole with the main line 13 by branch 31 which is also connected to contact bar 16. The other poles of relays 14, 15 can be connected to main line 12 by line 30 and switch 32 which is operated by the armature 33 of relay 29.

A contact finger 34 is secured to the telescope frame and is adapted to slide with its end on the contact bars 16, 17.

When the telescope 1 is turned to the right the finger 34 first connects contact bar 16 with contact 19 thus cutting in relay 27 which is then supplied with current through lines 13, 31, bar 16, finger 34, contact 19, line 24, its other pole being permanently connected to line 12 by means of lines 35 and 30. The relay 27 will for a moment attract its armature 36 thus breaking the contact 37 which is normally kept closed by any known means (spring, weight or the like).

When the finger 34 continues its movement the bar 16 is connected with contact plate 21 and current is supplied to the coil 38 of relay 28, from line 13, branch 31, contact 16, finger 34, plate 21, and line 25, said coil 38 being also connected with line 12, through lines 35 and 30. The relay 28 then attracts its double armature 39, 40 forming contacts at 41, 42. Hereby the second coil 43 of relay 28 is supplied with current from line 13, branch 31, and line 45 armature 36, contact 37, line 44, contact 41, and armature 39, which is permanently connected to line 12 by lines 35 and 30. This coil 43 will therefore keep itself cut in as long as the contact 37 is shut, e. g. as long as relay 27 is not cut in.

On further movement of the finger 34 the bar 16 is connected with contact 20, coil 38 being cut out and coil 46 of relay 29 being cut in. Current is then supplied from line 13, branch 31, bar 16, finger 34, contact 20, line 26, coil 46, line 35, line 30 to line 12. Relay 29 attracts its double armature 47, 32, thereby cutting in relay 15 and at the same time cutting in its other coil 48 which is permanently connected to line 31, so that current from line 13 is supplied through branch 31, armature 40, contact 42, line 50 contact 49 and armature 47 branch 30 to line 12.

On the relay 15 being cut in the electromagnetic coupling 11 is excited and worm 5 is driven so as to rotate gun 2 in the same direction as the telescope 1, e. g. toward the right.

The disk 4 is caused to rotate faster than the contact, so that the finger 34 will now move backward relatively to the contact bars but as long as relay 27 is not cut in e. g. as long as the finger has not yet reached contact 19 relay 15 will receive current and thus, disk 4 will be moved until contact 19 has overtaken finger 34. If the finger is moved farther along the operation will be continued until the movement of finger 34 is stopped.

It is clear that just the same operation will take place when the telescope is moved in the other direction.

The effect obtained by the above device is that the finger must be moved a certain distance before it brings the driving mechanism for the gun into action, whereupon it must be moved the same distance backward again relatively to the gun-disk before it can cut out the said driving mechanism.

It will easily be understood that this effect can be obtained by other means than the device specified above and in the following shall be described as an example a mechanical device for the same purpose.

Referring to Figs. 2 to 5 the contact finger 34, part of which only is shown on the drawing, is made yielding toward the disk 4 with contact bars 16, 17. On the under side of the finger 34 is pivoted a short lever 51 which in the middle position of the finger 34 (Fig. 5) is resting in a recess 52 in disk 4, thereby keeping the finger 34 at a certain distance from the contact bars on disk 4. The middle portion of contact bars 16, 17 is covered by a slotted wedge-shaped plate 53, the slot 54 of which affords just sufficient space for the finger 34 to slip through it. As seen on Fig. 5 the finger 34 in its middle position is kept by lever 51 just above the wedge shaped plate 53. When the finger 34 is moved to one side or another it will first slide over plate 53 as indicated on Fig. 4 (left side) with full lines. Then leaving the plate 53 it will slip down on the contact bars thereby cutting in the driving mechanism for disk 4. On moving back toward its middle position the finger 34 will slide under the plate 53 as shown on Fig. 4 (right side) in dotted lines, thus maintaining the contact until the free end of lever 51 slips into recess 52 and raises the finger up through slot 54 to its original position.

It will be noticed that just the same effect is obtained in this way as by the electrical device above described, and by adjusting the position of plate 53 by means of screw 23 or by any other means, the interval before cutting in the driving mechanism for disk 4 may be varied at will. Although the device is above described in connection with the lateral adjustment of a gun it is obvious that the same device may be applied for adjusting the elevation of a gun in accordance with any known sighting device or oreograph, and it should also be understood that the device may be adapted for the adjustment of other objects than guns.

Claims:

1. In a device for automatically controlling the movement of one object in accordance with the movement of another object, means for moving the controlled object, means for moving the controlling object, the first named means being adapted to move the controlled object at a greater speed than that of the controlling object, means for cutting in the moving means for the controlled object after the controlling object has been moved a certain distance, and means controlled by the relative movements of said objects for maintaining said moving means cut in until the original relative position of the controlled and controlling objects has been reëstablished.

2. In a device for automatically controlling the movement of one object in accordance with the movement of another object, means for moving the controlled object, means for moving the controlling object, the first named means being adapted to move the controlled object at a greater speed than that of the controlling object, means actuated automatically by the controlling object for cutting in the moving means for the controlled object after the controlling object has been moved a certain distance, and means controlled by the relative movements of said objects for maintaining said moving means cut in until the original relative position of the controlled and controlling objects has been reëstablished.

3. In a device for automatically controlling the angular movement of one object in accordance with the angular movement of another object, means for moving the controlled object, means for moving the controlling object, the first named means being adapted to move the controlled object at a greater speed than that of the controlling object, a main relay for starting the moving means for the controlled object, means comprising a contact finger actuated by the movement of the controlling object for cutting in said relay after the contact finger has been moved a certain distance, and means for keeping said relay cut in until the contact finger has been moved back to its original relative position with the controlled object.

4. In a device for automatically controlling the angular movement of one object in accordance with the angular movement of another object, means for moving the controlled object, means for moving the controlling object, the first named means being adapted to move the controlled object at a greater speed than that of the controlling object, a main relay for starting the moving means for the controlled object, a contact finger actuated by the controlling object, a contact bar coöperating with said finger to cut in the main relay, means for retarding the moment of contact of said finger with the bar, and means for keeping the relay cut in until the original relative position of the controlled and the controlling objects is reëstablished.

5. In a device for automatically controlling the angular movement of one object in accordance with the angular movement of another object, means for moving the controlled object, means for moving the controlling object, the first named means being adapted to move the controlled object at a greater speed than that of the controlling object, a main relay for starting the moving means for the controlled object, a contact finger actuated by the controlling object, a contact bar comprising a plurality of contacts coöperating with said finger to cut in the main relay, auxiliary relays connected to the several contacts, the first auxiliary relay cut in by the finger when the same is brought out of its middle position serving to cut out the main relay and the one last cut in serving to cut in the main relay to delay the action of the contact finger to cut in the main relay until it has moved a certain distance along the contact bar and keeping the main relay cut in until the original relative position of the controlled and the controlling objects is established.

6. In a device for automatically controlling the angular movement of one object in accordance with the angular movement of another object, means for moving the controlled object, means for moving the controlling object, the first named means being adapted to move the controlled object at a greater speed than that of the controlling object, a main relay for starting the moving means for the controlled object, a contact finger actuated by the controlling object, a contact bar coöperating with said finger to cut in the main relay and comprising two fixed and one intermediate adjustable contacts on each side of the middle position of the finger, auxiliary relays connected to said contacts, the relays connected to the fixed contacts serving to cut out and cut in the main relay, and the relay connected to the adjustable contact serving to control the distance to be passed by the finger before reaching the outer contact and thereby cutting in the main relay.

7. In a device of the character described, two stationary contacts, an adjustable wedge-shaped plate intermediate said stationary contacts, a main relay, means for cutting in the latter actuated by the stationary contact last reached by the contact finger, and means for cutting out the main relay actuated by the contact first reached by the contact finger.

In testimony that I claim the foregoing as my invention, I have signed my name in presence of two subscribing witnesses.

FRIDTJOV ANDERSEN.

Witnesses:
M. E. GUTTORMSEN,
R. WANG.

Copies of this patent may be obtained for five cents each, by addressing the "Commissioner of Patents, Washington, D. C."